(12) United States Patent
Lu

(10) Patent No.: US 6,791,560 B2
(45) Date of Patent: Sep. 14, 2004

(54) APPARATUS AND METHOD FOR ACCESSING VERTEX DATA

(75) Inventor: Chung-Yen Lu, Taipei (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 259 days.

(21) Appl. No.: 10/143,189

(22) Filed: May 10, 2002

(65) Prior Publication Data

US 2003/0112247 A1 Jun. 19, 2003

(30) Foreign Application Priority Data

Dec. 19, 2001 (TW) .................................. 90131495 A

(51) Int. Cl.[7] .................................................. G09G 5/36
(52) U.S. Cl. ...................... 345/557; 345/520; 345/503; 345/531; 345/564; 345/565
(58) Field of Search .............................. 345/418, 419, 345/427, 581, 619, 503, 520, 522, 531, 557, 564, 565

(56) References Cited

U.S. PATENT DOCUMENTS

| | | | | |
|---|---|---|---|---|
| 5,821,940 A | * | 10/1998 | Morgan et al. | ............. 345/420 |
| 6,369,813 B2 | * | 4/2002 | Pentkovski et al. | ......... 345/419 |
| 6,426,747 B1 | * | 7/2002 | Hoppe et al. | ............... 345/419 |
| 6,570,573 B1 | * | 5/2003 | Kazachinsky et al. | ...... 345/558 |
| 6,628,277 B1 | * | 9/2003 | Deering et al. | ............. 345/419 |
| 2002/0130874 A1 | * | 9/2002 | Baldwin | ..................... 345/506 |
| 2003/0001840 A1 | * | 1/2003 | Spitzer et al. | .............. 345/420 |

FOREIGN PATENT DOCUMENTS

EP        1096427 A2 *  5/2001

* cited by examiner

Primary Examiner—Ulka J. Chauhan
(74) Attorney, Agent, or Firm—Merchant & Gould P.C.

(57) ABSTRACT

A vertex data access apparatus and method. The apparatus receives a vertex index, compares the vertex index with any vertices' indices used before, issues a request if necessary for fetching vertex data in system memory, stores the return vertex data in a vertex data queue and gets corresponding vertex data from the vertex data queue for further processing and, more particularly, if the vertex index is the same as one of those vertices' indices, the corresponding vertex data can be directly fetched from the vertex data queue. The vertex data queue performs the vertex cache function.

25 Claims, 10 Drawing Sheets

APPARATUS AND METHOD FOR ACCESSING VERTEX DATA

BACKGROUND OF THE INVENTION

1. Field of the Invention

The present invention relates to a vertex data access apparatus and method, and particularly to a vertex data access apparatus and method that fetches vertex data from system memory according to vertex index and employs a vertex data queue to perform vertex cache function.

2. Description of the Related Art

A computer graphics accelerating system receives vertex data to produce a two-dimensional image of a scene or an object from a description or model of the object. The vertex data is usually settled in the system memory. One method for transferring the vertex data from system memory to the graphics accelerating system is that a vertex index is transferred first, and the graphics accelerating system according the vertex index sends an access request, and the vertex data is readied and returned. The method is referred as "Index Mode".

FIG. 1 is a simplified block diagram illustrating the graphics accelerating system 10 accessing the vertex data 31 in system memory 30 by way of an interface controller 20. The interface controller 20 comprises a request queue 21 and a vertex data queue 22. The request queue 21 stores memory requests generated by graphics accelerating system 10. The vertex data queue 22 stores vertex data 31 transferred from system memory 30 to later be fetched by the graphics accelerating system 10.

The transfer procedure is a split bus transaction protocol as illustrated in following steps:

Step 1. A vertex index is received.

Step 2. A request is sent and stored into a request queue.

Step 3. A request for access vertex data and is issued and removed from the request queue if the bus is available.

Step 4. After the vertex data is ready, it returned and stored into vertex data queue if the bus is available.

Step 5. If the graphics accelerating system needs the vertex data for further processing, access is performed and the vertex data is fetched from the vertex data queue.

It should be noted that the reuse of vertex data may take place. That is, a vertex cache can be adopted for improving performance in the graphics accelerating system. However, vertex data comprises screen coordinates, depth information, color information including red, green and blue, transparent factor, specular color information including specular red, specular green and specular blue, fog factor, and several sets of texture coordinates, storage of which can severely tax reaources.

SUMMARY OF THE INVENTION

It is therefore an object of the present invention to provide a vertex data access apparatus and method to utilize the vertex data queue for implementing the vertex cache to reduce the storage cost.

To achieve the above object, the present invention provides a vertex data access apparatus and method. According to one embodiment of the invention, the vertex data access apparatus includes an interface controller and a vertex data queue controller. The vertex data queue controller includes a limit counter, an available counter, an index comparator unit, a request controller and an access controller.

The limit counter records the number of requests issued. The available counter records the amount of return vertex data in vertex data queue not yet read. The index comparator unit is responsible for finding out whether the input vertex index is the same as any one index in an vertex index register, and report a corresponding result to the request controller. The request controller determines to send a vertex data request to the interface controller according to the result received from the index comparator unit and the value of the limit counter, and then stores the result into a reference register.

If a vertex data read signal is received by the access controller, the access controller reads the result stored in the reference register and accesses the vertex data from the vertex data queue according to the result and the value of the available counter.

Further, according to a second embodiment of the invention, a vertex data accessing method is provided. First, a vertex index is received. Then, a vertex data request corresponding to the vertex index is assessed to send according to the vertex index for fetching vertex data according to the vertex data request and store the vertex data into a vertex data queue.

Thereafter, the state of the vertex data queue is monitored. If a vertex data read signal is received, the vertex data is accessed from the vertex data queue according to the state of the vertex data queue.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE PREFERRED EMBODIMENT

Figure 1:
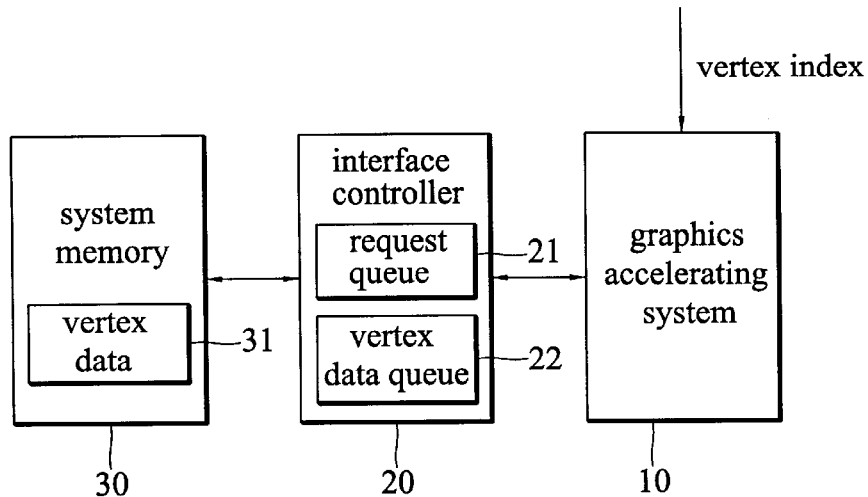
FIG. 1 is a schematic diagram illustrating a conventional graphics system.
Figure 2:
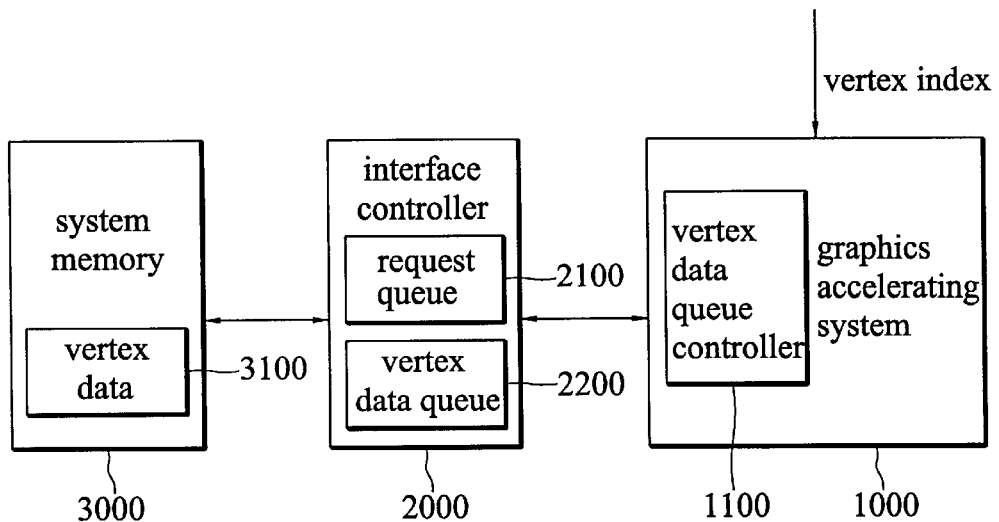
FIG. 2 is a schematic diagram illustrating a graphics system with vertex data queue controller according to the embodiment of the present invention.

FIG. 2 shows a graphics system with vertex data queue controller according to the embodiment of the present invention. the vertex data access apparatus includes an interface controller 2000 and a vertex data queue controller 1100. The interface controller 2000 is similar to the interface controller 20 in FIG. 1, it includes a request queue 2100 and a vertex data queue 2200. The vertex data queue controller 1100 is incorporated into the graphics accelerating system 1000 to communicate with the interface controller 2000 to control the access of vertex data as well as to perform the vertex cache function. The graphics accelerating system 1000 accesses the vertex data 3100 in system memory 3000 by way of the vertex data queue controller 1100.

The vertex data queue controller 1100 is responsible for determining whether to send a vertex data request for informing the interface controller 2000 to fetch corresponding vertex data in system memory 3000. The vertex data queue controller 1100 also monitors the state of the vertex data queue 2200 in the interface controller 2000, and it can fetch the vertex data in the vertex data queue 2200 according to the state of the vertex data queue 2200 if the graphics accelerating system 1000 needs the vertex data.

Because the access of vertex data from system memory to the graphics accelerating system has long latency, a pre-fetch mechanism is adopted for improving performance by way of a split bus transaction protocol. Since the graphics accelerating system processes vertex data in order according to the sequence of received vertices' indices, the vertex data can be fetched from system memory and stored into the vertex queue before use by the graphics accelerating system. Therefore, after several vertex data requests are issued, the corresponding vertex data are later sequentially sent into the vertex queue.

The vertex data queue controller 1100 not only controls the request and the vertex queues (2100 and 2200), it also checks whether the vertex data in the vertex queue 2200 can be re-used. Namely, the vertex data queue controller 1100 performs vertex cache function.

Figure 3:
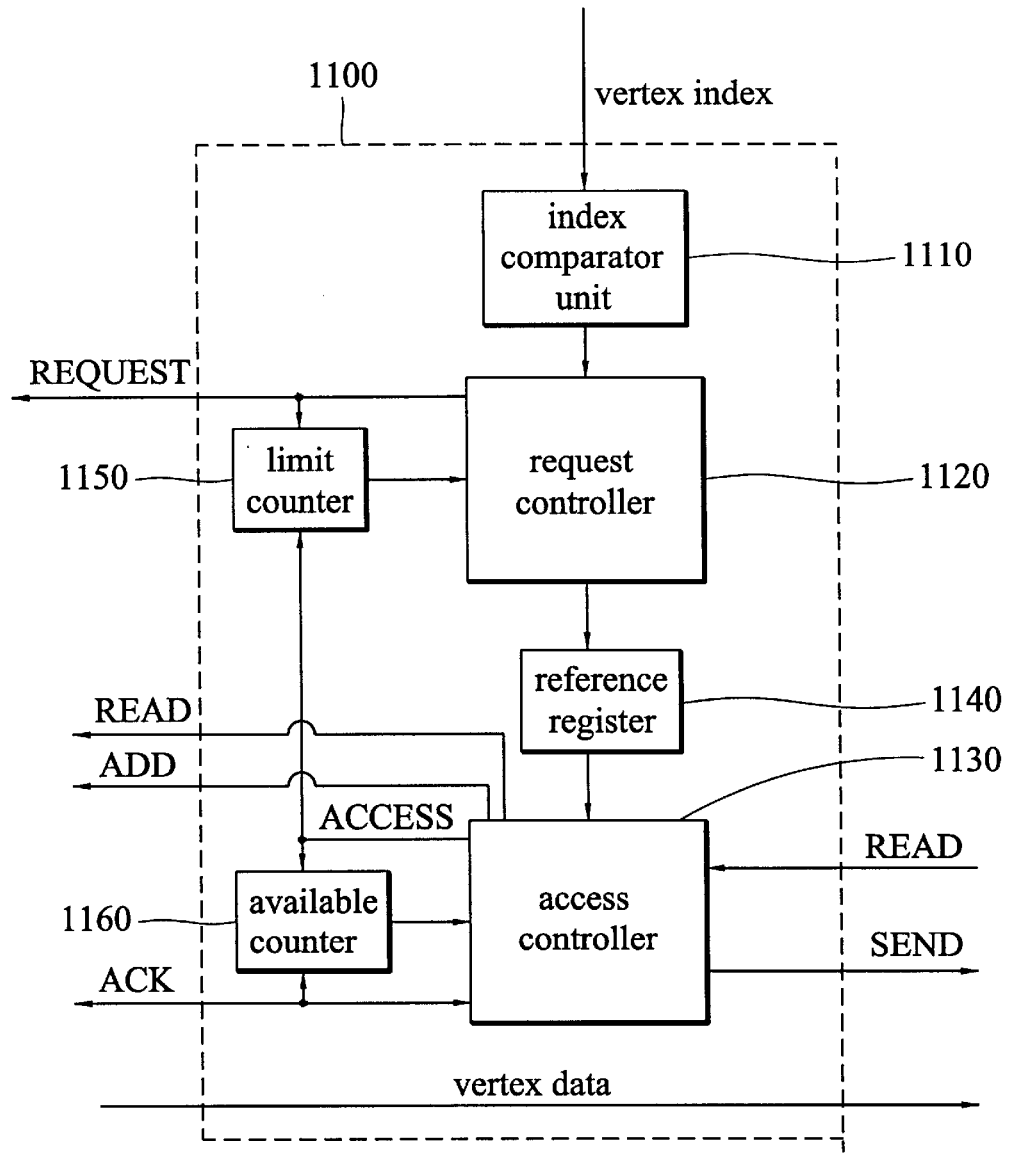
FIG. 3 is a block diagram showing the detailed structure of vertex data queue controller according to the embodiment of the present invention.

FIG. 3 shows the detailed structure of vertex data queue controller 1100. The vertex data queue controller 1100 includes a limit counter 1150, an available counter 1160, an index comparator unit 1110, a request controller 1120, an access controller 1130 and a reference register 1140. The limit counter 1150 records the number of requests issued by the interface controller 2000. The available counter 1160 records the amount of return vertex data in vertex data queue 2200 not yet read.

The index comparator unit 1110 is responsible for finding out whether the input vertex index is the same as any one index in a vertex index register, and reporting (output) a corresponding result to the request controller 1120. The request controller 1120 is compelled to send a vertex data request to the interface controller 2000 according to the result received from the index comparator unit 1110 and the value of the limit counter 1150, and then stores the result into the reference register 1140 if the reference register 1140 is not full. It should be noted that the vertex index register and the reference register 1140 may be first-in-first-out (FIFO) registers.

If the graphics accelerating system 1000 NEEDS vertex data, the access controller 1130 will be informed by a vertex data read signal, and the access controller 1130 reads the result stored in the reference register 1140 and accesses the vertex data from the vertex data queue 2200 according to the result and the value of the available counter 1160.

Figure 4:
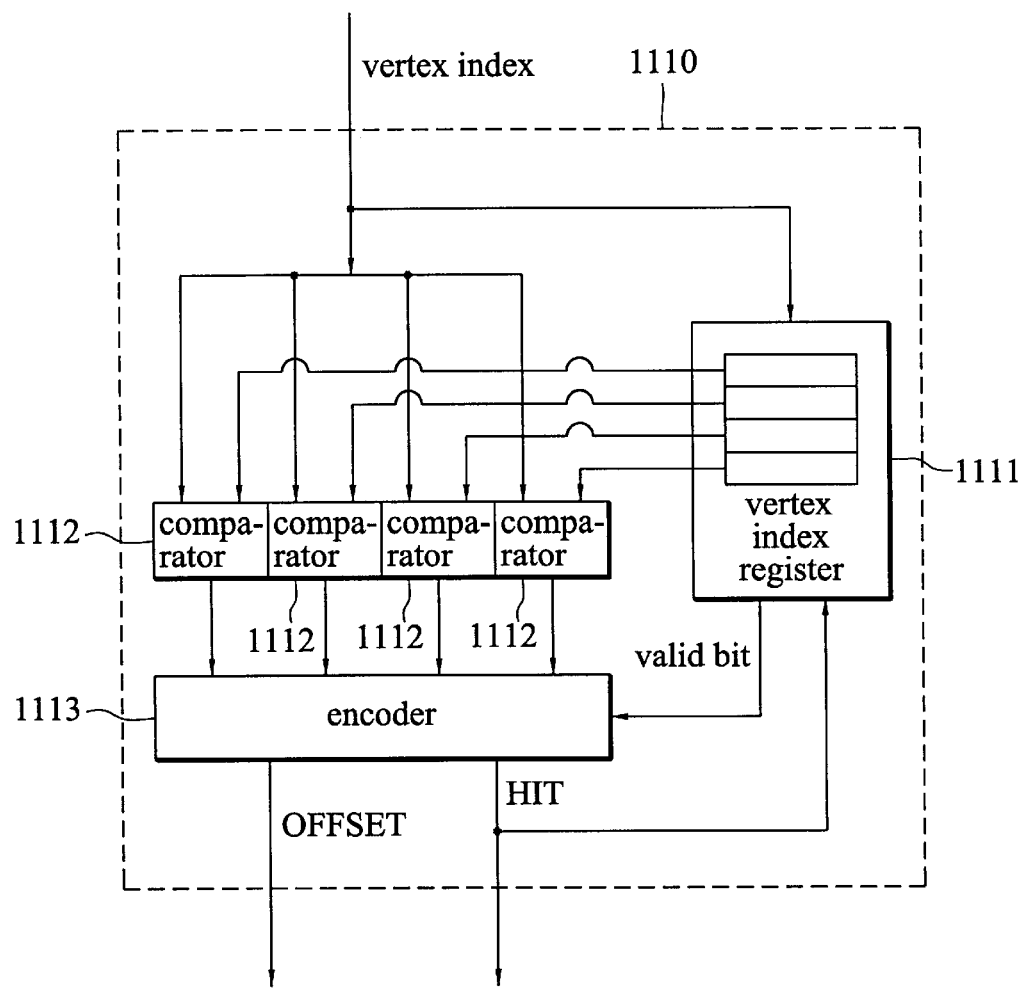
FIG. 4 is a block diagram showing the detailed structure of index comparator unit according to the embodiment of the present invention.

The index comparator unit 1110 includes the vertex index register 1111, a plurality of comparators 1112 and an encoder 1113 as illustrated in FIG. 4. In the case of FIG. 4, the index comparator unit 1110 includes four comparators, and the vertex index register 1111 includes four entries. The input vertex index is compared with all entries within the vertex index register 1111. The outputs of the comparators 1112 are a plurality of binary value signals, and they are encoded to generate signals HIT and OFFSET by the encoder 1113. If the input vertex index is the same as any one of the indices in the vertex index register 1111, HIT is active and OFFSET is the position of the vertex index which is the same as the input vertex index. Otherwise, all of the indices in the vertex index register 1111 are different from the input vertex index, HIT is inactive and OFFSET is forced to be 0.

Figure 5:
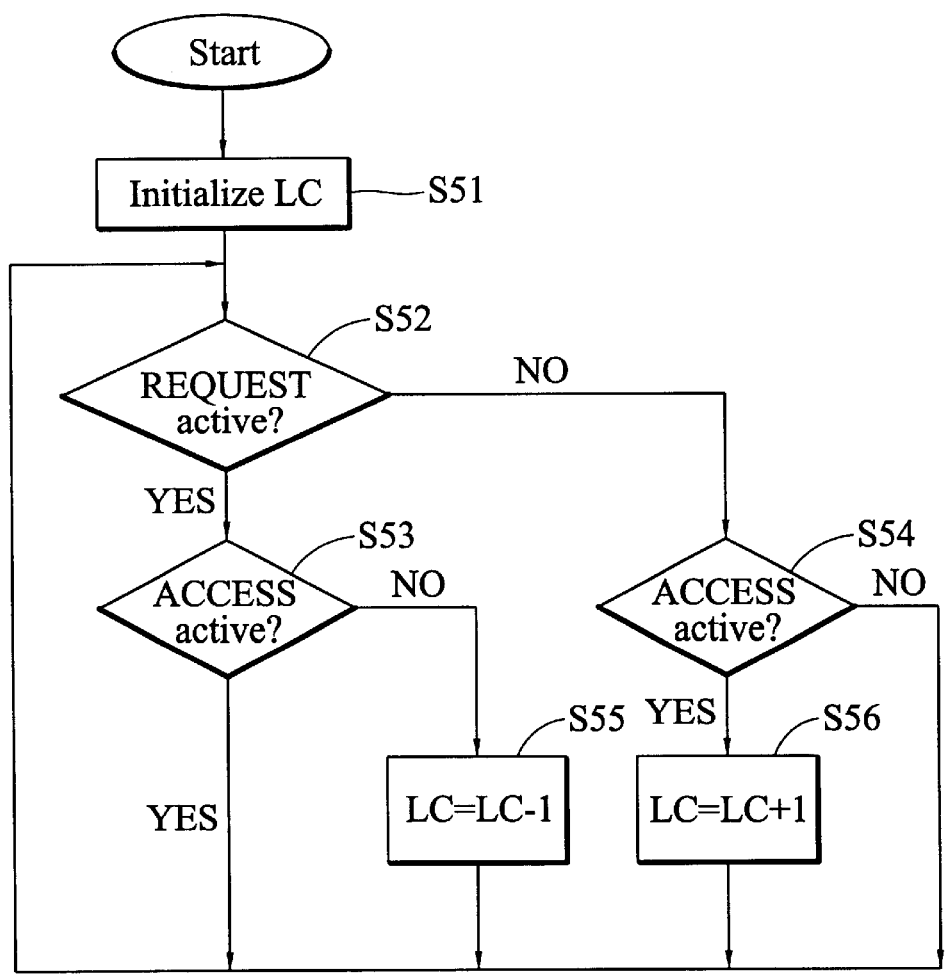
FIG. 5 is a flow chart illustrating the operation of limit counter.

The limit counter 1150 is an up/down counter whose value is increased or decreased by 1 each time. FIG. 5 is a flow chart illustrating the operation of the limit counter 1150. First, the value of the limit counter (LC) 1150 is initialized to be the maximum number of the requests that can be issued (Step S51). Once the signal REQUEST is active (YES in Step S52) and the signal ACCESS is inactive (NO in Step S53), the value of the limit counter 1150 decreases 1 (Step S55). Once the signal REQUEST is inactive (NO in Step S52) and the signal ACCESS is active (YES in Step S54), the value of the limit counter 1150 increases 1 (Step S56). If both signals REQUEST and ACCESS are active, the value of the limit counter 1150 is held. Otherwise, if neither REQUEST nor ACCESS are inactive, the value of the limit counter 1150 is not changed.

Figure 6:
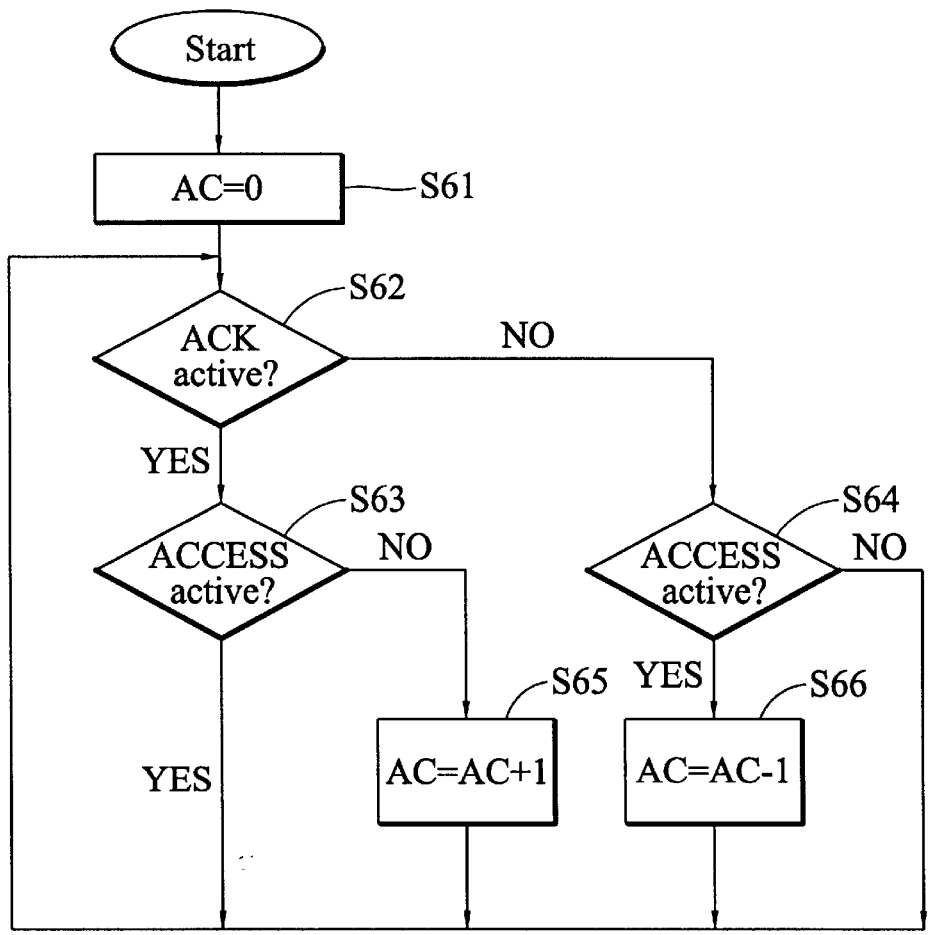
FIG. 6 is a flow chart illustrating the operation of available counter.

The available counter 1160 is an up/down counter whose value is increased or decreased by 1 each time. FIG. 6 is a flow chart illustrating the operation of the available counter 1160. First, the value of the available counter (AC) 1160 is initialized to zero (Step S61), that is, the vertex data queue 2200 is empty. Once the signal ACKNOWLEDGE (ACK) is active which means vertex data has arrived from system memory 3000 (YES in Step S62) and the signal ACCESS is inactive (NO in Step S63), the value of the available counter 1160 increases 1 (Step S65). Once the signal ACKNOWLEDGE (ACK) is inactive (NO in Step S62) and the signal ACCESS is active (YES in Step S64), the value of the available counter 1160 decreases 1 (Step S66). If both signals ACKNOWLEDGE (ACK) and ACCESS are active, the value of the available counter 1160 is held. Otherwise, if neither ACKNOWLEDGE (ACK) nor ACCESS are inactive, the value of the available counter 1160 is not changed.

Figure 7:
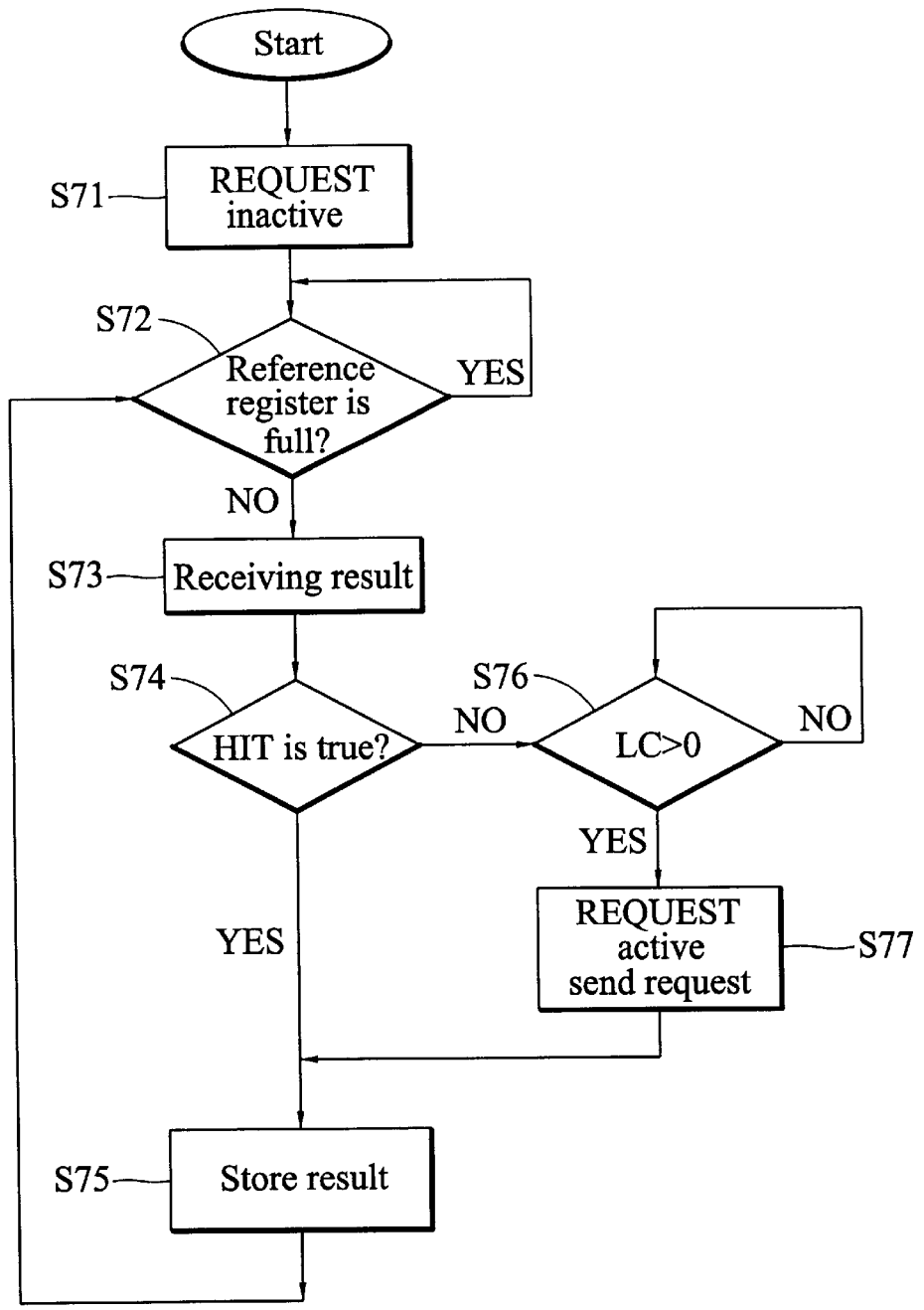
FIG. 7 is a flow chart illustrating the operation of request controller.

FIG. 7 illustrates the flowchart of the request controller 1120. First, signal REQUEST is set inactive (Step S71). When the reference register 1140 is not full (NO in Step S72), the request controller 1120 is able to handle a new vertex index. The vertex index is fed into the index comparator unit 1110, and then HIT and OFFSET are obtained and received by the request controller 1120 (Step S73). If HIT is true (YES in Step S74), the request controller 1120 simply stores the HIT and OFFSET into the reference register 1140 (Step S75). Otherwise, when HIT is false (NO in Step S74) and the value of the limit counter 1150 is greater than 0 (YES in Step S76), the REQUEST is set active and a vertex data request is sent to the interface controller 2000 (Step S77). Then, HIT and OFFSET are stored into the reference register 1140 (Step S75).

Figure 8:
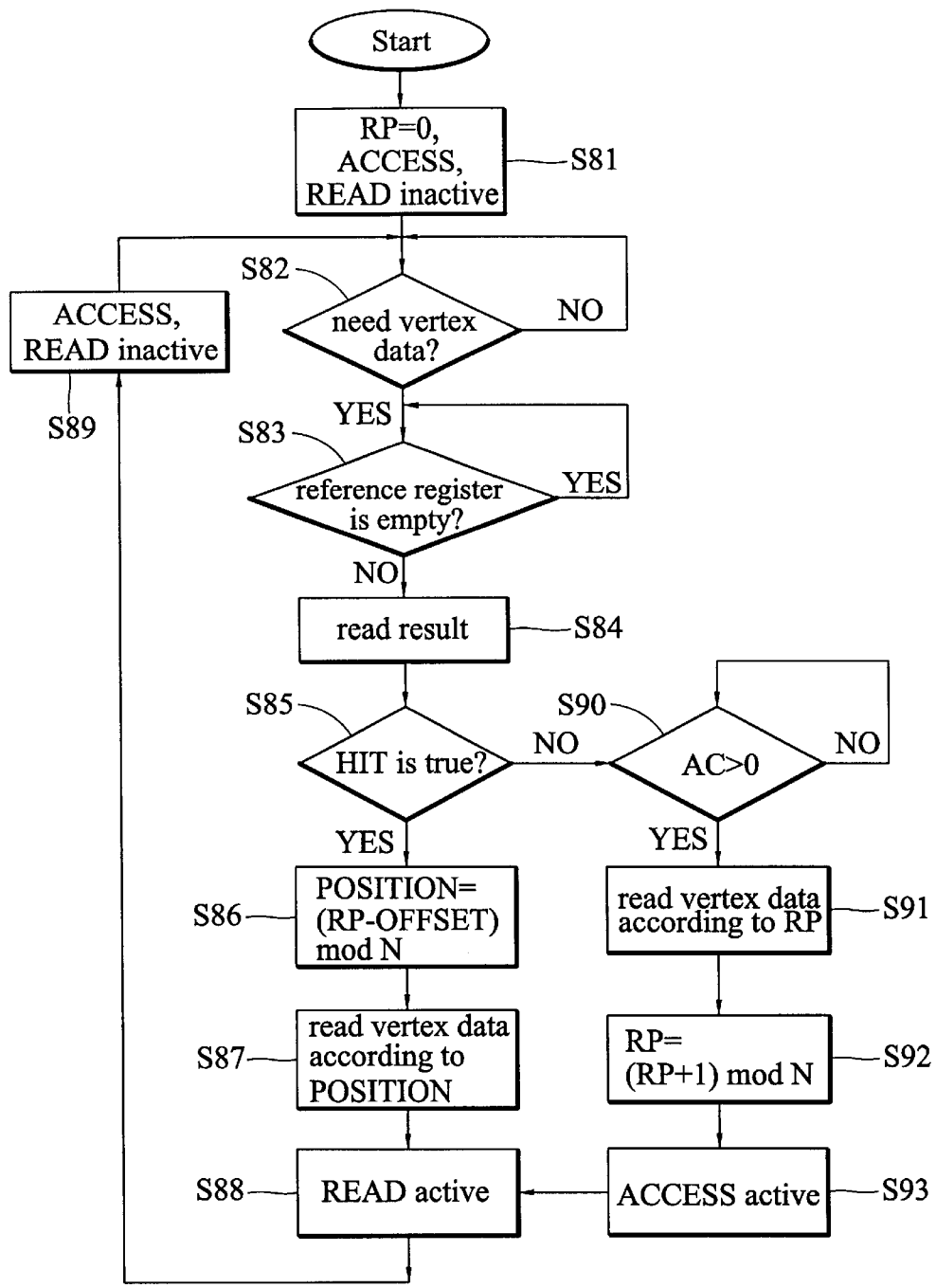
FIG. 8 is a flow chart illustrating the operation of access controller.

The access controller 1130 includes a ring counter referred as reference pointer (RP) that is a reference logical position in vertex data queue 2200. FIG. 8 illustrates the operation of access controller 1130. At initial stage, the signals ACCESS and READ are inactive, and the value of the reference pointer is set 0 (Step S81). When the graphics accelerating system 1000 asks for a vertex data (YES in Step S82) and the reference register 1140 is not empty (NO in Step S83), the access controller 1130 fetches a set of reference information from the reference register 1140 (Step S84). A set of reference information comprises HIT and OFFSET. There are two kinds of operating procedures in the access controller 1130: one is for HIT is true, and the other one is for HIT is false.

If HIT is true (YES in Step S85), the logical position of the target vertex data is computed by the value of the reference pointer and OFFSET as follows (Step S86):

POSITION=(RP-OFFSET) mod N

Then the interface controller 2000 will output the target vertex data according to the POSITION (Step S87). At the time, the access controller 1130 makes signal READ active to read the target vertex data (Step S88). Finally, signals ACCESS and READ are both set inactive (Step S89).

Otherwise, when HIT is false (NO in Step S85) and the value of the available counter is greater than 0 (YES in Step S90), the logical position of the target vertex data is the value of the reference pointer as follows:

POSITION=RP

Then the interface controller 2000 will output the target vertex data according to the RP (Step S91). Note that after the target vertex data is read, the reference pointer is updated (RP=(RP+1) mod N) (Step S92) and the signal ACCESS is active to inform the limit counter and the available counter (Step S93). At the time, the access controller 1130 makes signal READ active to read the target vertex data (Step S88). Finally, signals ACCESS and READ are both set inactive (Step S89).

Figure 9:
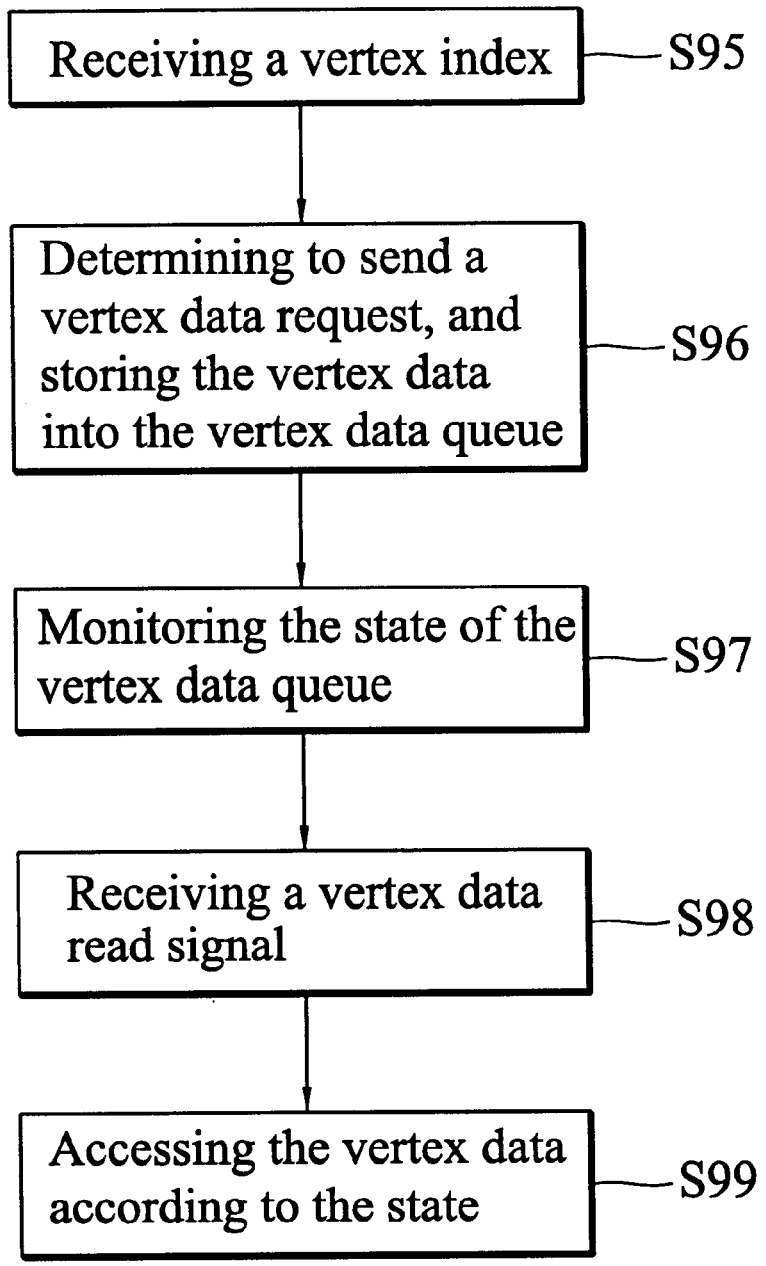
FIG. 9 is a flow chart illustrating the operation of a method for vertex data accessing according to the embodiment of the present invention.

FIG. 9 illustrates the operation of a method for vertex data accessing according to the embodiment of the present invention. First, in step S95, a vertex index is received by the vertex data queue controller 1100. Then, in step S96, a vertex data request corresponding to the vertex index is assessed to send according to the vertex index for informing the interface controller 2000 to fetch vertex data from the system memory 3000 according to the vertex data request and store the vertex data into the vertex data queue 2200.

Note that the vertex data request corresponding to the vertex index is assessed to send by finding out whether the input vertex index is the same as any one index in the vertex index register 1111, and output a corresponding result at first. Then, the vertex data request is assessed to send according to the result and the value of the limit counter 1150, and the result is stored into the reference register 1140.

Then, in step S97, the state of the vertex data queue 2200 is monitored by the vertex data queue controller 1100. Note that the monitoring process can be achieved by implementing the limit counter 1150, available counter 1160 and the reference pointer. That is, the state of the vertex data queue 2200 can be monitored by updating the limit counter 1150, available counter 1160 and the reference pointer.

Thereafter, in step S98, a vertex data read signal is received. Then, in step S99, the vertex data is accessed from the vertex data queue 2200 according to the state of the vertex data queue 2200. In step S99, a result stored in the reference register 1140 is read first and the vertex data is accessed from the vertex data queue 2200 according to the result and the value of the available counter 1160.

FIGS. 10A–10D demonstrate how the reference pointer (RP), the limit counter (LC) and available counter (AC) work. If the vertex data queue can have eight sets of vertex data, an update pointer (UP) is within interface controller to indicate the logical position in vertex data queue that the next receiving vertex data should be stored into. A reference pointer within vertex data queue controller indicates the logical position in vertex data queue for being reference position. A reference region (RR) in vertex data queue is determined by the value of the reference pointer. Let the size of the reference region is 3, meaning the vertex cache has 3 reference vertices.

Figure 10A:
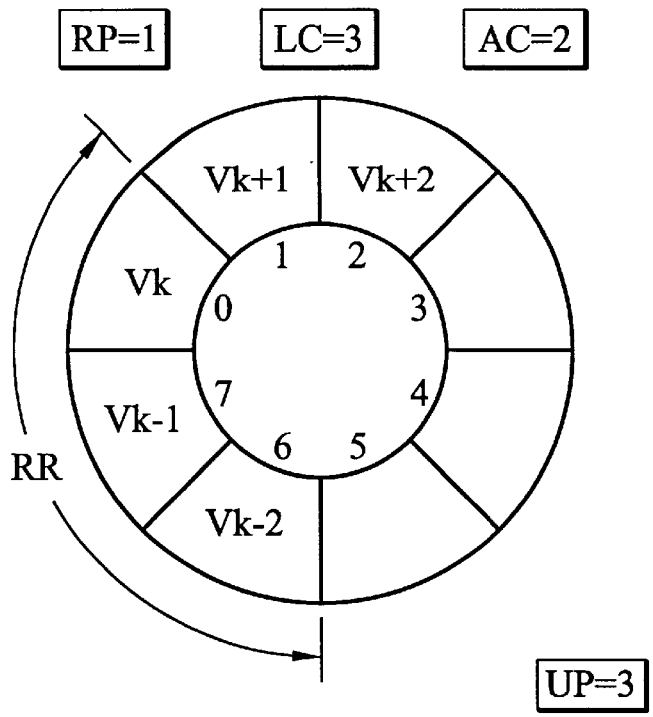
FIGS. 10A–10D illustrates the state of vertex data queue and the value of reference point, limit count and available counter.

FIG. 10A illustrates a moment of the vertex data queue, at which the vertex data queue has received five sets of vertex data as noted as $V_{k-2}$, $V_{k-1}$, $V_k$, $V_{k+1}$ and $V_{k+2}$. $V_{k-2}$, $V_{k-1}$ and $V_k$ are within the reference region. And $V_{k+1}$ and $V_{k+2}$ are not yet used by the graphics accelerating system.

The value of the update pointer is 3, meaning if the next received vertex data will be stored into the logical '3' position. The value of the limit counter is 3, because there are only three entries for storing vertex data. The value of the available counter is 2, meaning two sets of vertex data have been updated into the vertex data queue.

Figure 10B:
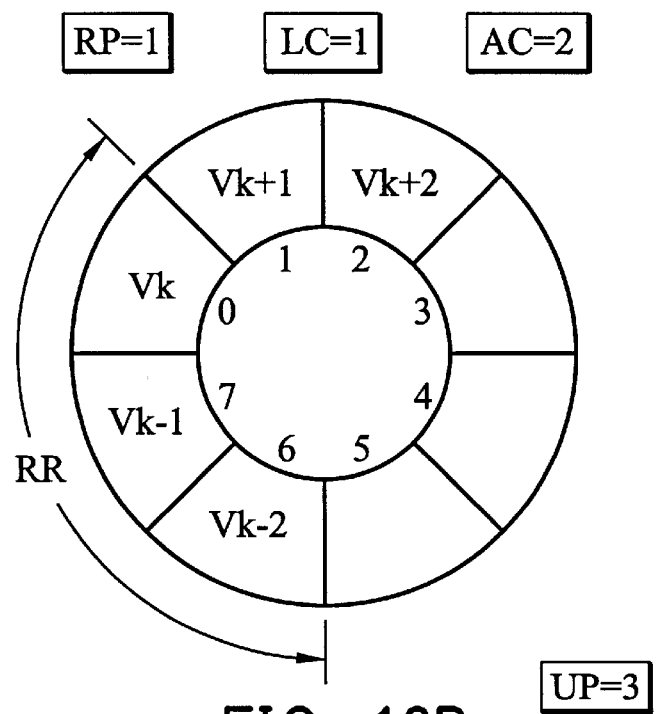

After the request controller issues two requests, only the value of the limit counter is changed as illustrated in FIG. 10B. Because the logical positions '3' and '4' in vertex data queue are reserved for storing the vertex data indicated by the two requests, only one logical position is free and the value of the limit counter should be 1.

Figure 10C:
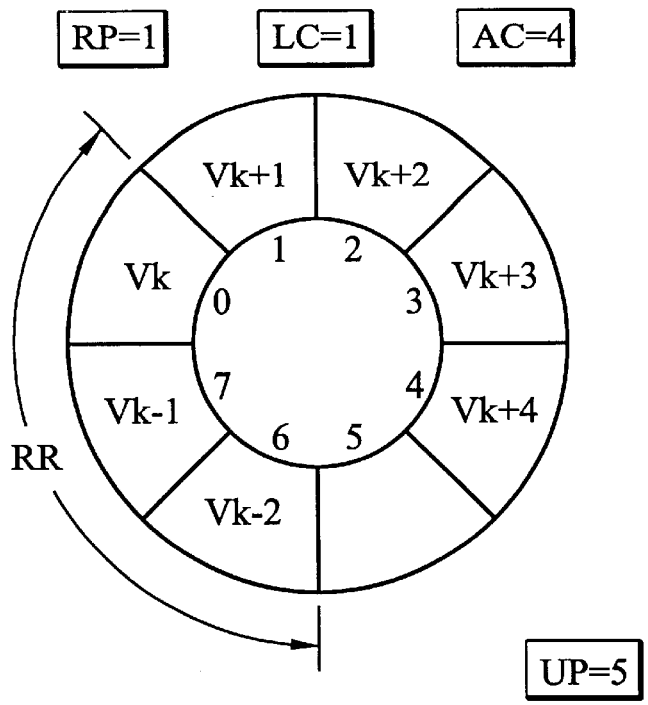

When the two sets of vertex data return, the vertex data queue will have 7 sets of vertex data as illustrated in FIG. 10C. The value of the available counter is 4. And the update pointer indicates the logical position '5'.

Figure 10D:
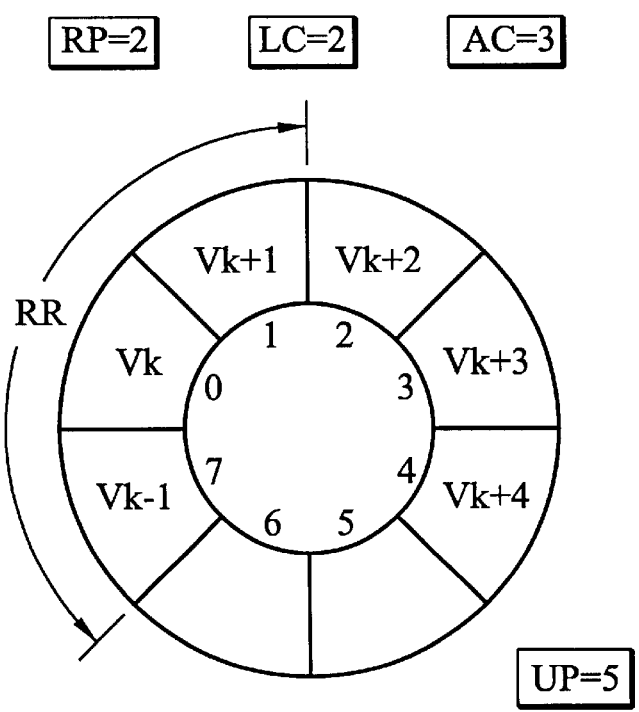

If the vertex data queue controller accesses vertex data in the reference region ($V_{k-2}$, $V_{k-1}$ or $V_k$), no changes happen in the reference pointer, the limit counter and the available counter. Otherwise, if the vertex data queue controller accesses $V_{k+1}$, the value of the reference pointer becomes 2, and the reference region is changed as illustrated in FIG. 10D. Note that the limit counter increases and the available counter decreases at the same time.

As a result, using the vertex data access apparatus and method according to the present invention, vertex data can be fetched from system memory according to vertex index and the vertex data queue can be utilized for implementing the vertex cache to reduce the storage cost.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A vertex data access apparatus, comprising:
   an interface controller having a vertex data queue to receive a vertex data request, fetch vertex data from a system memory according to the vertex data request, and store the vertex data into the vertex data queue; and
   a vertex data queue controller to receive a vertex index, determine to send the vertex data request corresponding to the vertex index to the interface controller according to the vertex index, monitor the state of the vertex data queue, and access the vertex data from the vertex data queue according to the state in which a vertex data read signal is received;
   wherein the vertex data queue controller comprises:
      an index comparator unit for finding out whether the vertex index is the same as any one index in an vertex index register, and reporting a corresponding result;

a limit counter to record the number of requests issued by the interface controller; and a request controller coupled to the index comparator unit to receive the result, determine to send the vertex data request to the interface controller according to the result and the value of the limit counter, and store the result into a reference register.

2. The apparatus as claimed in claim 1 wherein the value of the limit counter is decreased by 1 if the vertex data request is sent to the interface controller.

3. The apparatus as claimed in claim 1 wherein the vertex data queue controller further comprises:

an available counter to record the amount of return vertex data in the vertex data queue not yet read; and an access controller to read the result stored in the reference register and access the vertex data from the vertex data queue according to the result and the value of the available counter if the vertex data read signal is received.

4. The apparatus as claimed in claim 3 wherein the value of the limit counter is increased by 1 and the value of the available counter is decreased by 1 if the vertex data stored in the vertex data queue is accessed by the access controller.

5. The apparatus as claimed in claim 3 wherein the value of the available counter is increased by 1 if the vertex data is stored into the vertex data queue.

6. The apparatus as claimed in claim 1 wherein the vertex index is stored into the vertex register if the vertex index is not same as any one index in the vertex index register.

7. The apparatus as claimed in claim 1 wherein the result comprises signals HIT and OFFSET.

8. The apparatus as claimed in claim 1 wherein the vertex index register is a First-In-First-Out (FIFO) register.

9. The apparatus as claimed in claim 1 wherein the reference register is a First-In-First-Out (FIFO) register.

10. A vertex data queue controller, comprising:

a limit counter to record the number of requests issued by the interface controller;

an available counter to record the amount of return vertex data in the vertex data queue not yet read;

an index comparator unit to receive a vertex index for finding out whether the vertex index is the same as any one index in an vertex index register, and reporting a corresponding result;

a request controller coupled to the index comparator unit to receive the result, determine to send the vertex data request to the interface controller according to the result and the value of the limit counter, and store the result into a reference register, thus the interface controller fetches a vertex data from a system memory according to the vertex data request and stores the vertex data into an vertex data queue; and an access controller to read the result stored in the reference register and access the vertex data from the vertex data queue according to the result and the value of the available counter if the vertex data read signal is received.

11. The apparatus as claimed in claim 10 wherein the vertex data read signal is sent by a graphics accelerating system.

12. The apparatus as claimed in claim 10 wherein the value of the limit counter is decreased by 1 if the vertex data request is sent to the interface controller.

13. The apparatus as claimed in claim 10 wherein the value of the limit counter is increased by 1 and the value of the available counter is decreased by 1 if the vertex data stored in the vertex data queue is accessed by the access controller.

14. The apparatus as claimed in claim 10 wherein the value of the available counter is increased by 1 if the vertex data is stored into the vertex data queue.

15. The apparatus as claimed in claim 10 wherein the vertex index is stored into the vertex index register if the vertex index is not same as any one index in the vertex index register.

16. The apparatus as claimed in claim 10 wherein the result comprise signals HIT and OFFSET.

17. The apparatus as claimed in claim 10 the vertex index register and reference register are First-In-First-Out (FIFO) registers.

18. A vertex data access method, comprising the steps of:

receiving a vertex index;

determining to send a vertex data request corresponding to the vertex index according to the vertex index for informing an interface controller to fetch vertex data from a system memory according to the vertex data request and store the vertex data into a vertex data queue;

monitoring the state of the vertex data queue;

receiving a vertex data read signal; and accessing the vertex data from the vertex data queue according to the state of the vertex data queue;

wherein the vertex data request is assessed to send by finding out whether the input vertex index is the same as any one index in an vertex index register and output a corresponding result, and determining to send the vertex data request according to the result and the number of requests issued by the interface controller.

19. The method as claimed in claim 18 further storing the result into a reference register.

20. The method as claimed in claim 19 wherein access of the vertex data from the vertex data queue according to the state of the vertex data queue further comprises the steps of:

reading the result stored in the reference register; and accessing the vertex data from the vertex data queue according to the result and the amount of return vertex data in the vertex data queue not yet read.

21. The method as claimed in claim 20 wherein the number of requests issued by the interface controller is increased by 1 and the amount of return vertex data in the vertex data queue not yet read is decreased by 1 if the vertex data stored in the vertex data queue is accessed by to access controller.

22. The method as claimed in claim 20 wherein the amount of return vertex data in the vertex data queue not yet read is increased by 1 if the vertex data is stored into the vertex data queue.

23. The method as claimed in claim 20 wherein the number of requests issued by the interface controller is decreased by 1 if the vertex data request is sent to the interface controller.

24. The method as claimed in claim 18 further storing the vertex index into the vertex index register if the vertex index is not same as any one index in the vertex index register.

25. The method as claimed in claim 18 wherein the result comprise signals 1117 and OFFSET.

* * * * *